United States Patent
Lin et al.

(10) Patent No.: US 8,388,234 B1
(45) Date of Patent: Mar. 5, 2013

(54) ONE-PIECE OPTICAL FIBER ADAPTER

(75) Inventors: Sung An Lin, Miaoli County (TW); Sung Chi Lin, Miaoli County (TW)

(73) Assignee: Ezontek Technologies Co., Ltd., Taipei County (TW)

( * ) Notice: Subject to any disclaimer, the term of this patent is extended or adjusted under 35 U.S.C. 154(b) by 0 days.

(21) Appl. No.: 13/420,694

(22) Filed: Mar. 15, 2012

(30) Foreign Application Priority Data

Aug. 24, 2011 (TW) .............. 100130229 A (51) Int. Cl.
*G02B 6/38* (2006.01)
(52) U.S. Cl. .......................... 385/55; 382/58
(58) Field of Classification Search ............ 385/53, 385/55, 56, 58
See application file for complete search history.

(56) References Cited

U.S. PATENT DOCUMENTS

| | | | |
|---|---|---|---|
| 6,431,762 B1 * | 8/2002 | Taira et al. ............... | 385/56 |
| 8,192,091 B2 * | 6/2012 | Hsu et al. ................ | 385/55 |
| 2012/0057825 A1 * | 3/2012 | Lin et al. ................ | 385/78 |
| 2012/0057830 A1 * | 3/2012 | Taira et al. .............. | 385/78 |
| 2012/0057831 A1 * | 3/2012 | Taira et al. .............. | 385/78 |

* cited by examiner

*Primary Examiner* — Kevin S Wood (57) ABSTRACT

An optical fiber adapter includes a main body and a pair of inner housings. The main body has an accommodation room having opposing first and second openings in an axial direction. First through fourth stop blocks are positioned on the walls or within the accommodation room. Each inner housing is positioned within the accommodation room, and includes a flange having opposing front and back surfaces and a hollow cylinder extending from the front surface of the flange. The flanges of the two inner housings are attached to each other and are positioned between the first and second stop blocks, and between the third and fourth stop blocks. The first, second, third and fourth stop blocks are positioned to restrict a movement of the flanges in the axial direction. The first opening is configured for an optical fiber connector and the two inner housings to insert into the accommodation room.

15 Claims, 9 Drawing Sheets

ONE-PIECE OPTICAL FIBER ADAPTER

CROSS REFERENCE TO RELATED APPLICATION

This application claims the priority benefit of Taiwan Patent Application Serial Number 100130229 filed Aug. 24, 2011, the full disclosure of which is incorporated herein by reference.

BACKGROUND OF THE INVENTION

1. Field of the Invention

The present invention relates to an optical fiber adapter, and more particularly, to a one-piece optical fiber adapter.

2. Description of the Related Art

Figure 1:
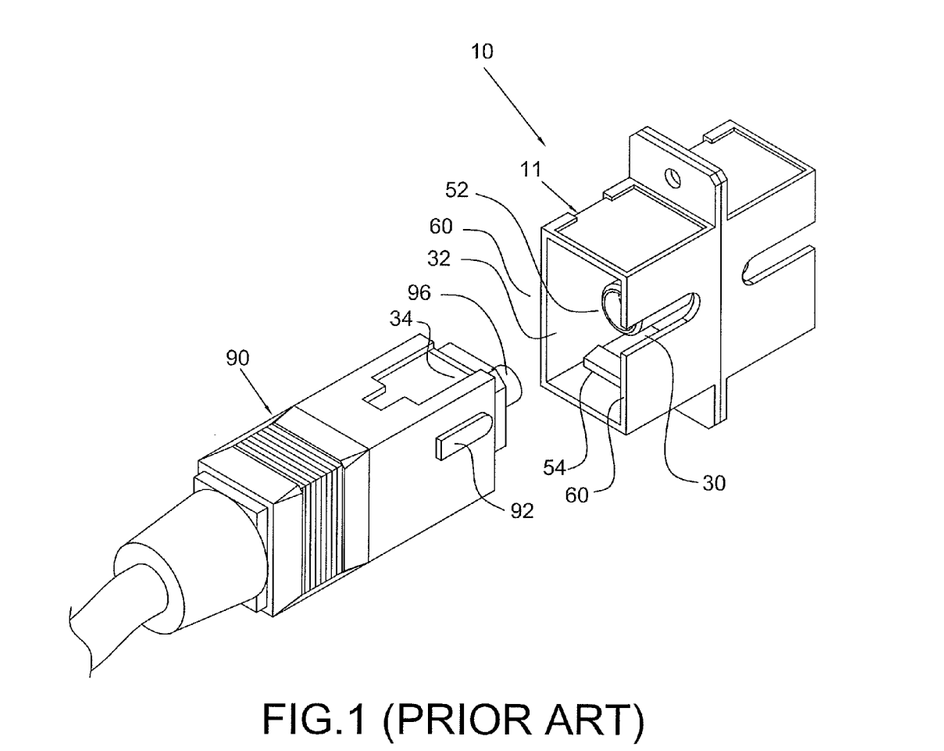
FIG. 1 is an elevated perspective view illustrating a conventional SC type optical fiber adapter and a conventional SC type optical fiber connector.

Referring to FIG. 1, a conventional SC type one-piece optical fiber adapter 10 includes a main body 11. The main body 11 has an accommodation room 32 defined by a plurality of side-walls 60, wherein the accommodation room 32 is configured to receive an optical fiber connector 90. When the optical fiber connector 90 is inserted into the accommodation room 32 of the optical fiber adapter 10, a key protrusion 92 on the connector 90 will be received in a guiding slot 30 on one side-wall 60. In addition, the optical fiber adapter 10 further includes a sleeve 52 to receive a ferrule 96 of the connector 90 and a pair of hooks 54 to hook on to recesses 34 on the connector 90 when the connector 90 is mated with the adapter 10.

Figure 2:
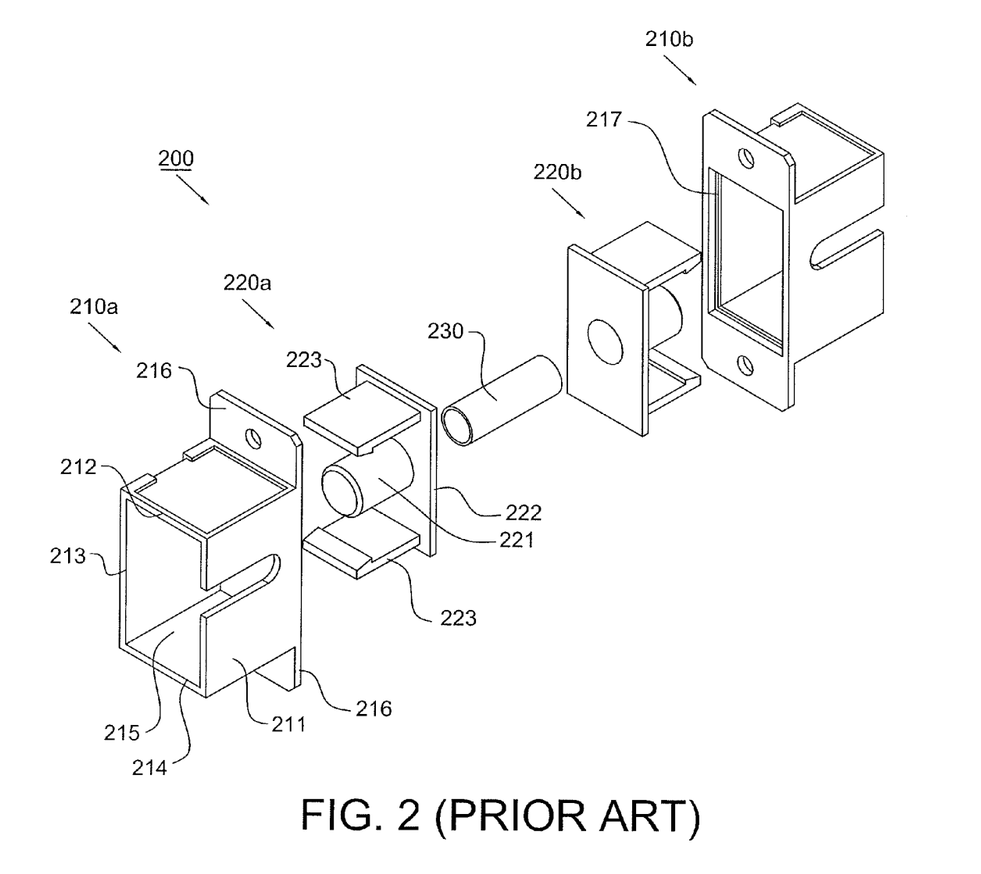
FIG. 2 is an exploded view of a conventional SC type optical fiber adapter.
Figure 3A:
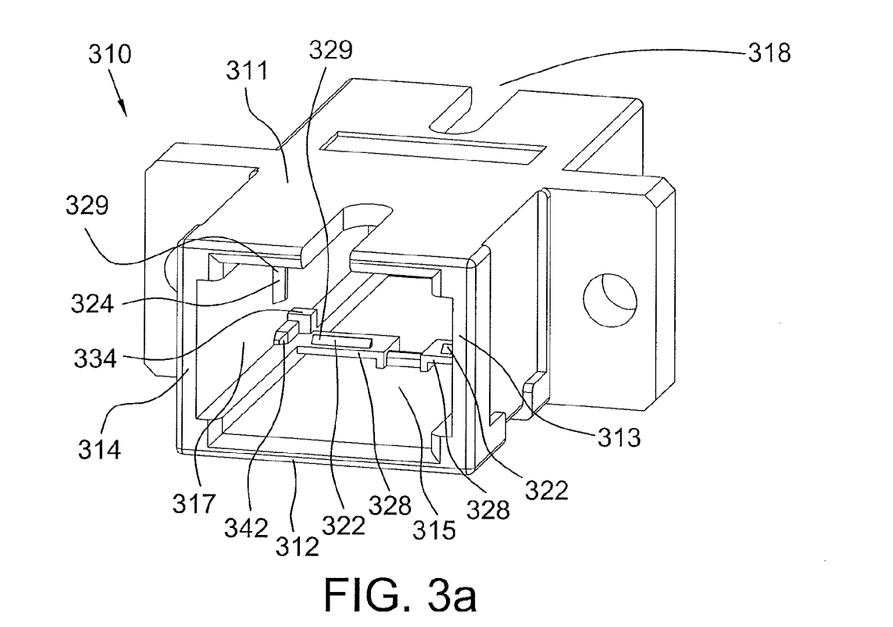
FIGS. 3a to 3d are different perspective views of the main body of the optical fiber adapter of the present disclosure.
Figure 3B:
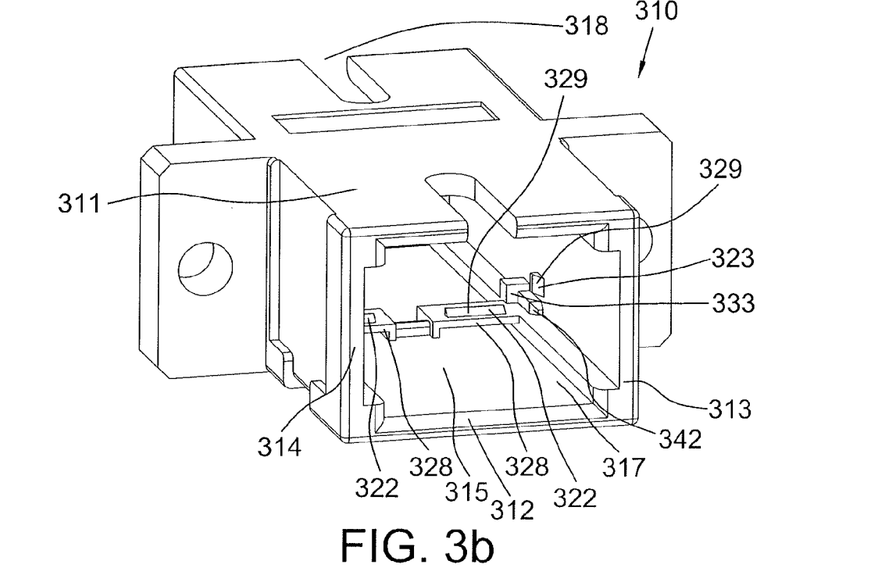
Figure 3C:
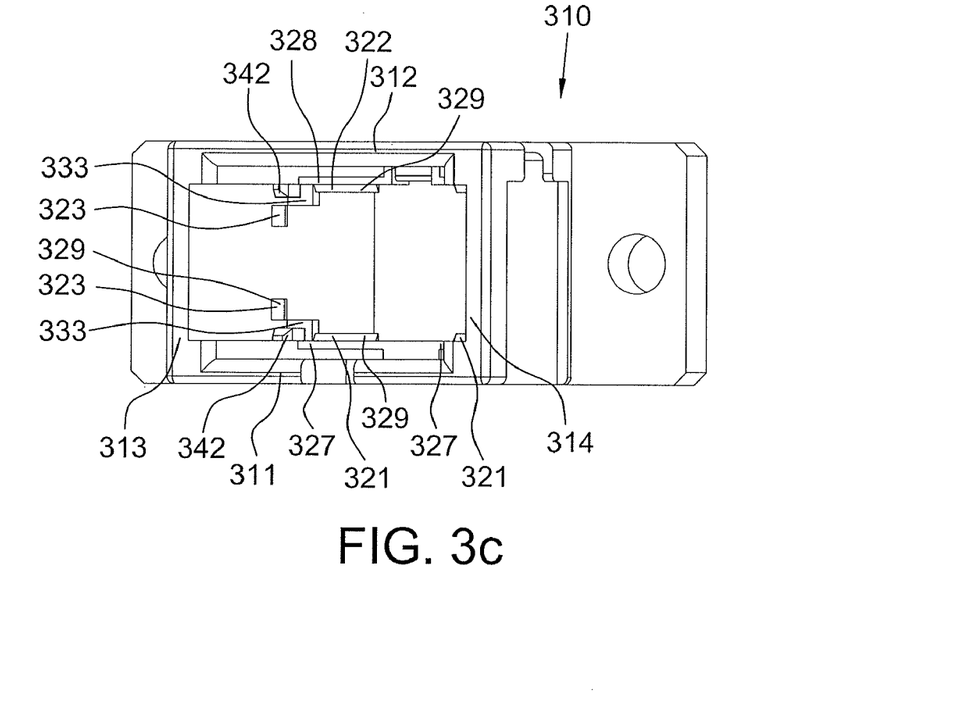
Figure 3D:
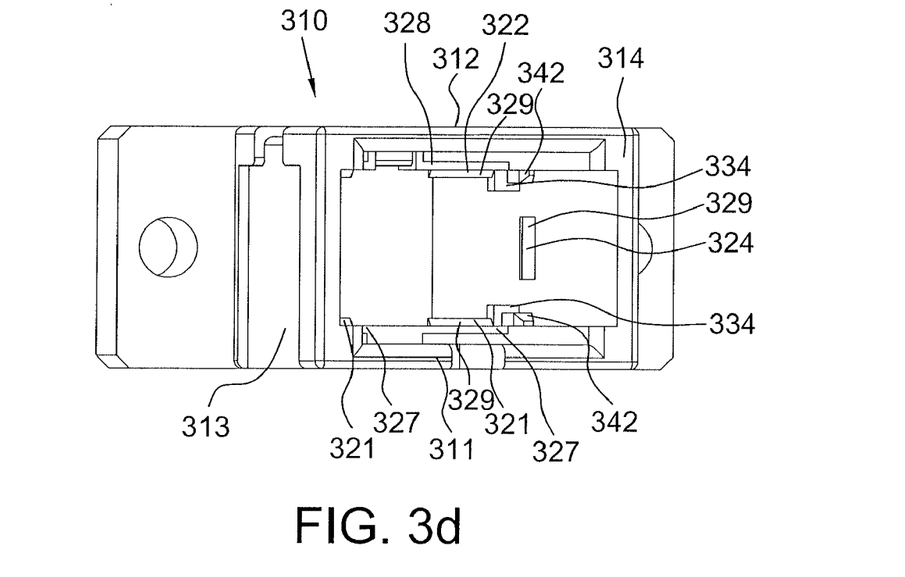
Figure 3E:
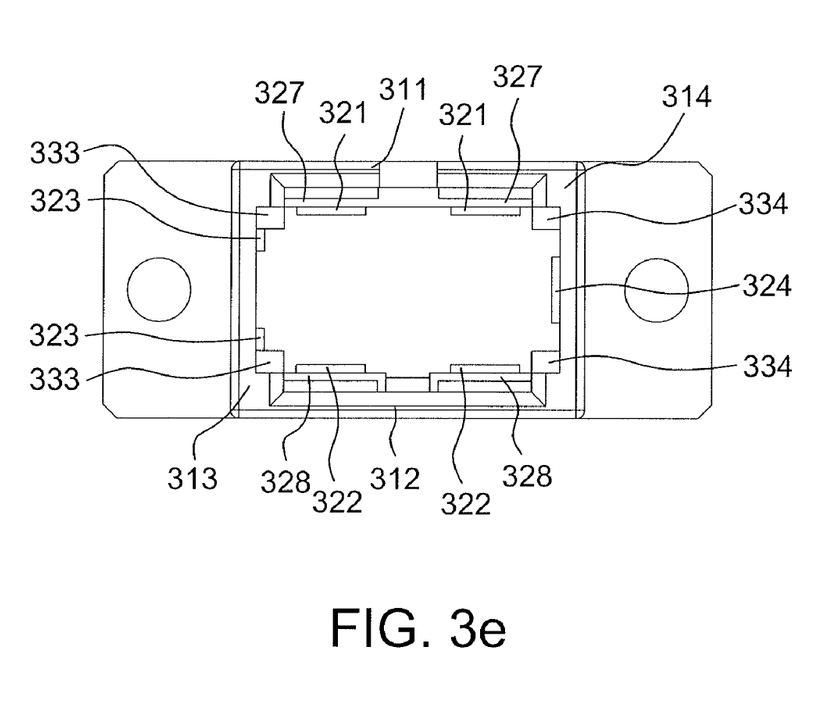
FIG. 3e is a rear view of the main body of the optical fiber adapter of the present disclosure.

Referring to FIG. 2, a conventional optical fiber adapter 200 includes a first outer housing 210a and a second outer housing 210b, a first inner housing 220a, a second inner housing 220b and a sleeve 230. The first outer housing 210a is identical to the second outer housing 210b and the first inner housing 220a is identical to the second inner housing 220b.

Each of the outer housings 210a, 210b has a rectangular accommodation room 215 defined by four side-walls 211, 212, 213, 214, wherein the accommodation room 215 is configured to receive the optical fiber connector 90. A pair of tabs 216 is provided on the side-walls 212 and 214, respectively so as to secure the adapter 200 on a panel. In addition, two elongated protrusions 217 are formed on the side-walls 211, 213 of each the outer housings 210a, 210b, respectively, wherein the protrusions 217 are parallel to and separated for a predetermined distance from edges of the side-walls 211, 213, respectively. Each of the inner housings 220a, 220b is provided with a pair of hooks 223 extending from one surface of a generally rectangular flange 222. The flange 222 includes a hollow cylinder 221 located between the two hooks 223. The flange 222 is sized to be placed within the rectangular accommodation room 215 of the outer housing 210a, 210b and has a thickness equal to the predetermined distance from the protrusions 217 to the edges of the side-wall 211, 213.

The outer housings 210a, 210b, inner housings 220a, 220b and sleeve 230 may be assembled to form the optical fiber adapter 10 of FIG. 1. The inner housings 220a, 220b are placed within the outer housings 210a, 210b, respectively and the sleeve 230 is inserted into the cylinders 221 of the inner housings 220a and 220b. Afterward, the tabs 216 of the outer housings 210a and 210b are bonded together by ultrasonic welding so that the outer housings 210a and 210b are attached to each other.

Because the tabs 216 are ultrasonically welded together, a welding line is present on the adapter 200. Furthermore, the adapter 200 has more parts and therefore is time-consuming to assemble.

Accordingly, there exists a need to provide a solution to solve the aforesaid problems.

SUMMARY OF THE INVENTION

The present disclosure provides an optical fiber adapter that has fewer parts and is simpler and easier to assemble.

In one embodiment, the optical fiber adapter of the present disclosure includes a main body and a pair of inner housings. The main body has an accommodation room defined by a first wall, a second wall, a third wall and a fourth wall, wherein the first wall faces the third wall and connects with the second and fourth wall. The accommodation room has opposing first and second openings in an axial direction. A first stop block is positioned on the first wall and a third stop block is positioned on the third wall. A second stop block is positioned within the accommodation room and a fourth stop block is positioned within the accommodation room. The inner housings are positioned within the accommodation room, wherein each of the inner housings includes a flange having opposing front and back surfaces and a hollow cylinder extending from the front surface of the flange. The flanges of the two inner housings are attached to each other and are positioned between the first and second stop blocks, and between the third and fourth stop blocks. The first, second, third and fourth stop blocks are positioned to restrict a movement of the flanges in the axial direction. The first opening is configured for an optical fiber connector and the two inner housings to insert into the accommodation room.

The present disclosure further provides a method of assembling the above optical fiber adapter.

The foregoing, as well as additional objects, features and advantages of the disclosure will be more readily apparent from the following detailed description, which proceeds with reference to the accompanying drawings.

DETAILED DESCRIPTION OF THE PREFERRED EMBODIMENT

Referring to FIGS. 3a to 3e, the optical fiber adapter according to the present disclosure includes a unitary molded plastic main body 310. The main body 310 is substantially rectangular and has an accommodation room 315 defined by a top side-wall 311, a bottom side-wall 312, a right side-wall 313 and a left side-wall 314, wherein the top side-wall 311 faces the bottom side-wall 312 and connects with the right side-wall 313 and left side-wall 314. The accommodation room 315 has opposing first opening 317 and second opening 318 in an axial direction through which an optical fiber connector may be inserted into the accommodation room 315. At least one elastic supporting plate 328, for example, two elastic supporting plates 328 are positioned over the bottom side-wall 312 for a predetermined distance. Specifically, the supporting plates 328 are located away from the bottom side-wall 312 and therefore a clear gap is formed between the supporting plates 328 and the bottom side-wall 312. A stop block 322 is formed on each of the supporting plates 328. At least one elastic supporting plate 327, for example, two elastic supporting plates 327 are positioned over the top side-wall 311 for a predetermined distance. Specifically, the supporting plates 327 are located away from the top side-wall 311 and therefore a clear gap is formed between the supporting plates 327 and the top side-wall 311. A stop block 321 is formed on each of the supporting plates 327. At least one stop block 323 is formed on the right side-wall 313 and at least one stop block 324 is formed on the left side-wall 314. Each of the stop blocks 321, 322, 323, 324 has a narrow top surface, a wide bottom surface, an inclined side surface 329 facing the first opening 317 of the accommodation room 315 and a vertical side surface facing the second opening 318 of the accommodation room 315. Two stop blocks 333 are further formed on the right side-wall 313, wherein one stop block 333 is positioned near the top side-wall 311 and the other stop block 333 is positioned near the bottom side-wall 312. Two stop blocks 334 are further formed on the left side-wall 314, wherein one stop block 334 is positioned near the top side-wall 311 and the other stop block 334 is positioned near the bottom side-wall 312.

Figure 4A:
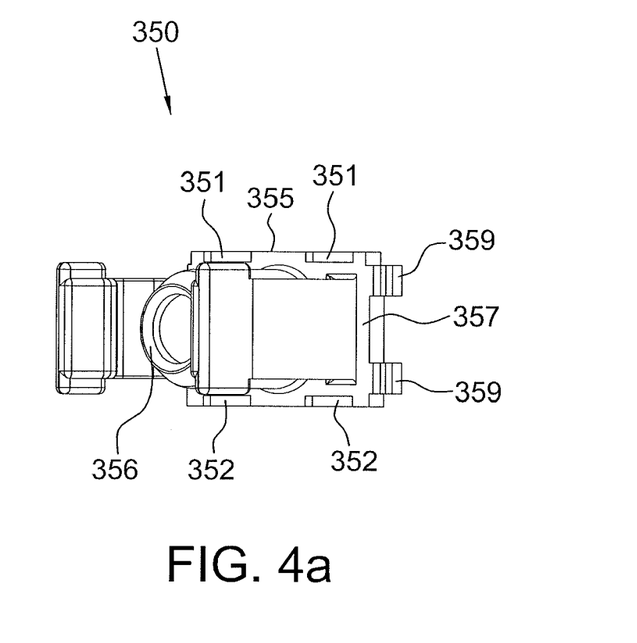
FIG. 4a is a perspective view of the inner housing of the optical fiber adapter of the present disclosure.
Figure 4B:
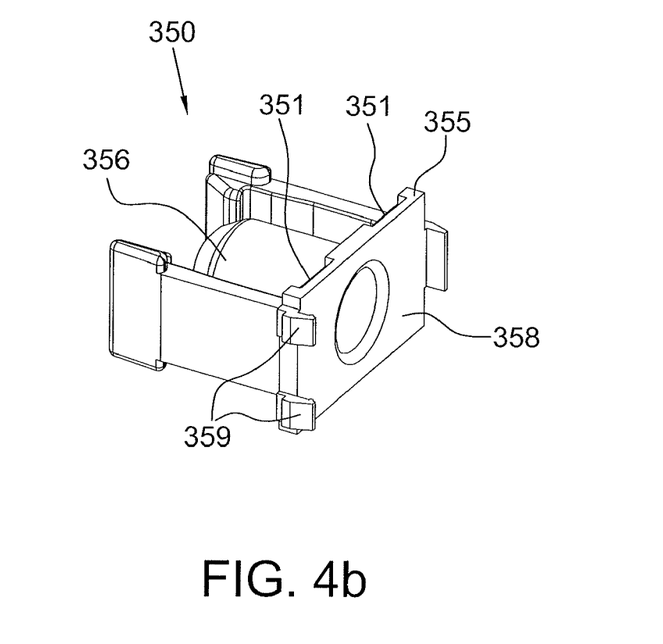
FIG. 4b is another perspective view of the inner housing of the optical fiber adapter of the present disclosure.

Referring to FIGS. 4a and 4b, the optical fiber adapter of the present disclosure includes a pair of inner housings 350. The two inner housings 350 are identical to each other in structure and are placed within the accommodation room 315. Each of the inner housings 350 is provided with a pair of hooks extending from a front surface 357 of a generally rectangular flange 355. The flange 355 includes a hollow cylinder 356 located between the two hooks. In addition, two indentations 351 and two indentations 352 are formed at two opposing edges of the front surface 357 of the flange 355, respectively, which are configured to receive the stop blocks 321 and 322, respectively. A plurality of hooks 359 extends from an edge of a back surface 358 of the flange 355.

Figure 5:
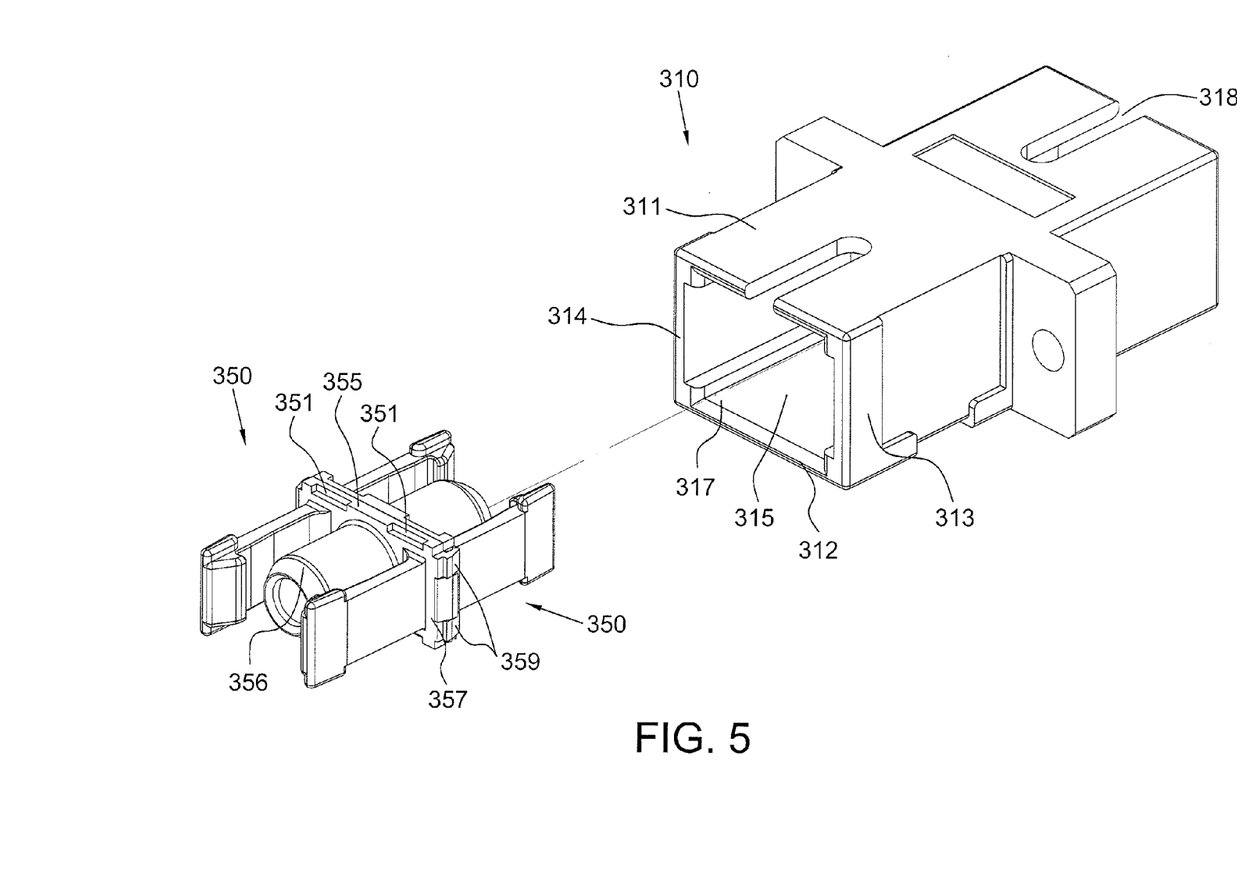
FIG. 5 illustrates the combined inner housings and the main body according to the present disclosure.
Figure 6A:
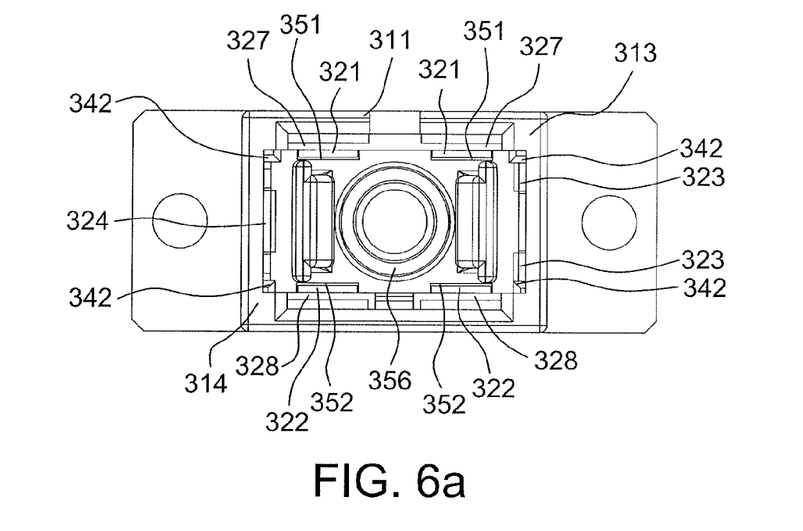
FIG. 6a is a front view of the optical fiber adapter of the present disclosure.
Figure 6B:
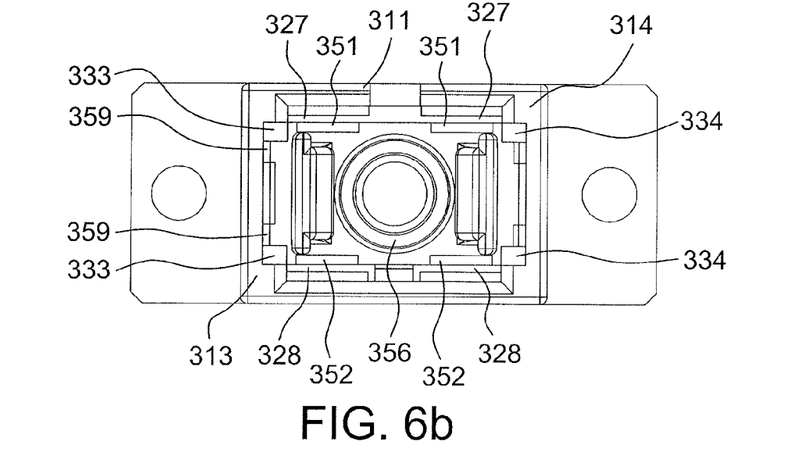
FIG. 6b is a rear view of the optical fiber adapter of the present disclosure.
Figure 7A:
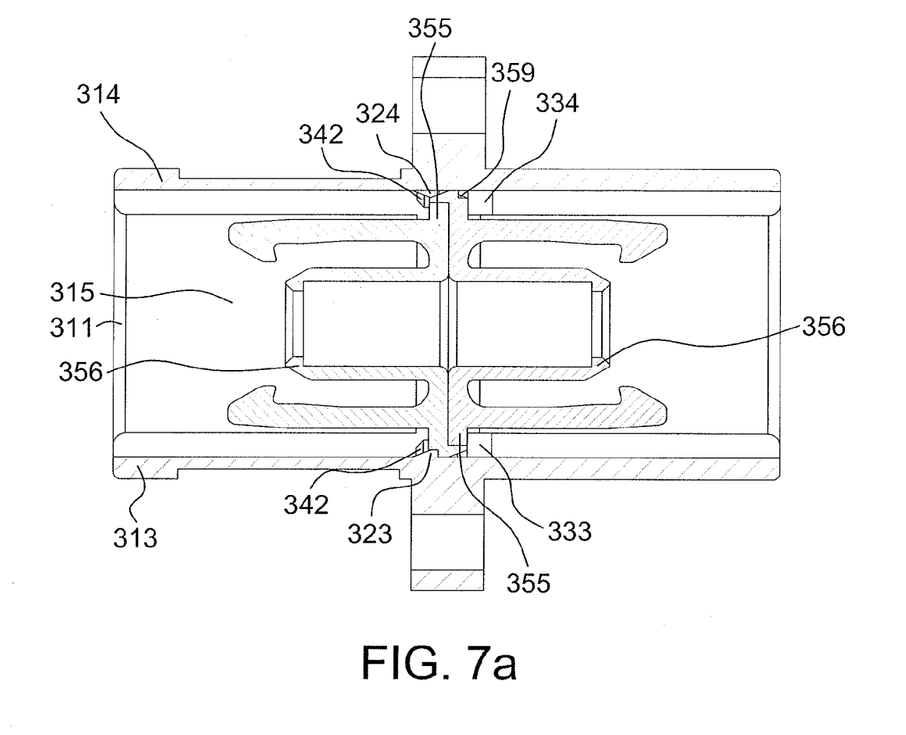
FIG. 7a is a cross-sectional view of the optical fiber adapter of the present disclosure.
Figure 7B:
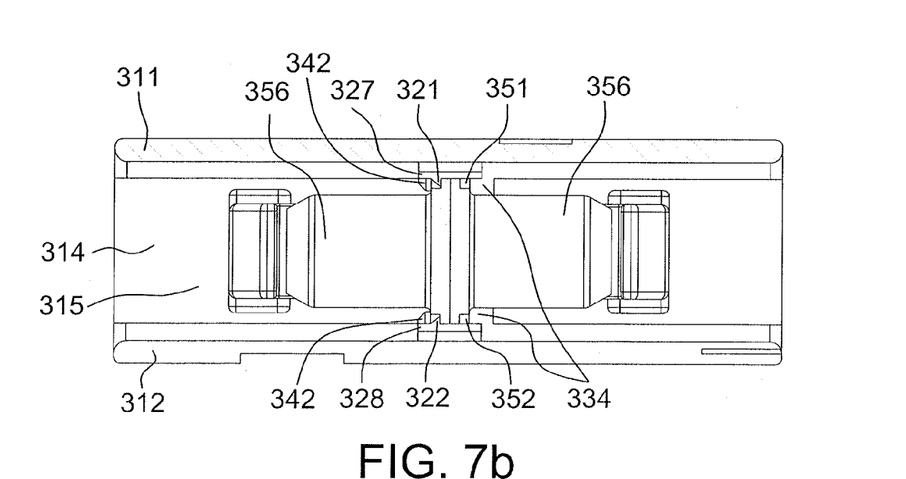
FIG. 7b is another cross-sectional view of the optical fiber adapter of the present disclosure.

Referring to FIG. 5, when desiring to assemble the optical fiber adapter of the present disclosure, the two inner housings 350 are combined together by attaching the back surfaces 358 of the flanges 355 to each other. The hooks 359 formed on one the flange 355 hook on to an edge of the other flange 355. Afterward, the combined inner housings 350 are inserted into the accommodation room 315 through the first opening 317 thereof. When the inner housings 350 continue to be pushed into the accommodation room 315, the front surface 357 of the heading flange 355 will first meet the stop blocks 321, 322, 323, 324 and the flanges 355 then slide upward on the inclined side surfaces 329 of the stop blocks 321, 322, 323, 324. Referring to FIGS. 6a, 6b, 7a and 7b, after the flanges 355 pass the stop blocks 321, 322, 323, 324, the stop blocks 333, 334 will then stop the flanges 355 from moving ahead and the stop blocks 321, 322 are received in the indentations 351, 352 of the tail flange 355. If a pull force is exerted on the inner housings 350, the tail flange 355 will meet the vertical side surfaces of the stop blocks 321, 322, 323, 324 thereby prevent the inner housings 350 from being pulled out of the accommodation room 315 through the first opening 317. Therefore, when the inner housings 350 are located in position in the accommodation room 315, the edges of the two flanges 355 will be positioned between the stop blocks 321, 322, 323, 324 and the stop blocks 333, 334. By this arrangement, the movement of the flanges 355 within the accommodation room 315 in the axial direction will be restricted.

According to the optical fiber adapter of the present disclosure, since the stop blocks 321, 322 are positioned on the elastic supporting plates 327, 328, respectively, the stop blocks 321, 322 will be pushed down when the flanges 355 of the inner housings 350 slide on the inclined side surfaces 329 of the stop blocks 321, 322. Therefore, this arrangement may help the flanges 355 pass the stop blocks 321, 322. Referring to FIGS. 3a to 3d again, a plurality of guiding blocks 342 is formed on the left and right side-walls 314, 313. The guiding blocks 342 are of tapering shape and may restrict the traverse movement of the flanges 355 of the inner housings 350 in the accommodation room 315 when the inner housings 350 are inserted into the accommodation room 315 in the axial direction.

According to the optical fiber adapter of the present disclosure, the main body 310 is integrally formed. Therefore, there is no welding line is present on the adapter. Furthermore, the optical fiber adapter of the present disclosure has fewer parts and therefore is simpler and easier to assemble.

Although the present disclose has been explained in detailed with SC type optical fiber adapter, it will be appreciated that the optical fiber adapter of the present disclosure may include other types of adapters. For example, the optical fiber adapter of the present disclosure may be the LC type optical fiber adapter.

Although the preferred embodiments of the disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. An optical fiber adapter, comprising:
   a main body having an accommodation room defined by a first wall, a second wall, a third wall and a fourth wall, the first wall facing the third wall and connecting with the second and fourth walls, wherein the accommodation room has opposing first and second openings in an axial direction;
   a first stop block positioned on the first wall;
   a second stop block positioned within the accommodation room;
   a third stop block positioned on the third wall;
   a fourth stop block positioned within the accommodation room; and
   a pair of inner housings positioned within the accommodation room, each the inner housing comprising:
      a flange having opposing front and back surfaces; and
      a hollow cylinder extending from the front surface of the flange,
      wherein the flanges of the two inner housings are attached to each other and are positioned between the first and second stop blocks, and between the third and fourth stop blocks, and wherein the first, second, third and fourth stop blocks are positioned to restrict a movement of the flanges in the axial direction,
   wherein the first opening is configured for an optical fiber connector and the two inner housings to insert into the accommodation room.

2. The optical fiber adapter as claimed in claim 1, further comprising an elastic first supporting plate to carry the first stop block.

3. The optical fiber adapter as claimed in claim 2, wherein the first supporting plate is located away from the first wall.

4. The optical fiber adapter as claimed in claim 1, wherein each of the first and third stop blocks has an inclined side surface facing the first opening of the accommodation room.

5. The optical fiber adapter as claimed in claim 4, further comprising:
a fifth stop block positioned on the second wall; and
a sixth stop block positioned on the fourth wall,
wherein each of the fifth and sixth stop blocks has an inclined side surface facing the first opening of the accommodation room.

6. The optical fiber adapter as claimed in claim 1, wherein the second and fourth stop blocks are positioned on the second and fourth walls, respectively.

7. The optical fiber adapter as claimed in claim 4, further comprising:
a first guiding block and a second guiding block positioned on the second and fourth walls, respectively.

8. The optical fiber adapter as claimed in claim 4, wherein each the inner housing has a hook extending from the flange to hook on to the flange of the other inner housing.

9. The optical fiber adapter as claimed in claim 1, wherein a plurality of indentations is formed on the front surface of one the flange to receive the first and third stop blocks, respectively.

10. The optical fiber adapter as claimed in claim 1, wherein the main body is integrally formed.

11. A method of assembling an optical fiber adapter, comprising:
providing a main body having an accommodation room defined by a first wall, a second wall, a third wall and a fourth wall, the first wall facing the third wall and connecting with the second and fourth walls, the accommodation room having opposing first and second openings in an axial direction, the first opening being configured for an optical fiber connector to insert into the accommodation room, wherein a first stop block is positioned on the first wall, a second stop block and a fourth stop block are positioned within the accommodation room, a third stop block is positioned on the third wall;
providing a pair of inner housings, each the inner housing has a hollow cylinder extending from a flange;
inserting the two inner housings into the accommodation room of the main body through the first opening; and
positioning the flanges of the two inner housings between the first and second stop blocks, and between the third and fourth stop blocks.

12. The method as claimed in claim 11, further comprising:
sliding the flanges of the two inner housings on the first and third stop blocks.

13. The method as claimed in claim 12, wherein the first stop block is positioned on an elastic first supporting plate.

14. The method as claimed in claim 13, wherein the first supporting plate is located away from the first wall.

15. The method as claimed in claim 11, wherein each of the first and third stop blocks has an inclined side surface facing the first opening of the accommodation room, the method comprising:
sliding the flanges of the two inner housings on the inclined side surfaces of the first and third stop blocks.

* * * * *